VARIABLE SIZE MODULE SEQUENCE AND INSERTION APPARATUS

Filed April 1, 1968 2 Sheets-Sheet 1

INVENTORS,
ALBERT W. ZEMEK
PAUL V. McDONALD
BY Fidelman & Wolffe
ATTORNEYS

VARIABLE SIZE MODULE SEQUENCE AND INSERTION APPARATUS

Filed April 1, 1968 2 Sheets-Sheet 2

INVENTORS,
ALBERT W. ZEMEK
PAUL V. McDONALD
BY Fidelman & Wolffe
ATTORNEYS

United States Patent Office 3,545,064

Patented Dec. 8, 1970

3,545,064

VARIABLE SIZE MODULE SEQUENCE AND INSERTION APPARATUS

Albert W. Zemek, Binghamton, N.Y., and Paul V. McDonald, Hallstead, Pa., assignors to Universal Instrument Corporation, Binghamton, N.Y., a corporation of New York Filed Apr. 1, 1968, Ser. No. 717,627
Int. Cl. H05k *13/04;* B23q *17/00*
U.S. Cl. 29—203 14 Claims

ABSTRACT OF THE DISCLOSURE

An apparatus adapted to insert sequentially supplied variable sized modules into a circuit board which includes a module supply means; a module insertion means adapted to be reciprocated between a variable first position and a module insertion position; module feed means including module guide means adjustable to accommodate variable sized modules, the supply means being adapted to sequentially present one module at a time to the feed means and the feed means being adapted to feed the presented module to the insertion means when in the first position thereof; and means to vary the first position of the insertion means in accordance with the size of the module presented to the feed means, the insertion means functioning to adjust the module guide means in accordance with the first position of the insertion means.

The present invention relates to an apparatus for inserting modules into a circuit board, and more particularly, represents an improvement in the insertion apparatus of the type disclosed in copending application Ser. No. 574,394, filed Aug. 23, 1966.

In the insertion machine disclosed in Ser. No. 574,394, there is provided a module or electrical component insertion means adapted to be reciprocated between an upper or first position and a lower or module insertion position, a supporting assembly adapted to position modules one at a time in the path of reciprocation of the insertion means to permit the latter to engage and thereafter insert a module into a circuit board, a module supply, and means to feed modules one at a time from the supply onto the supporting assembly. However, the apparatus disclosed is only adapted to insert modules having body portions of substantially the same size or thickness; the thickness being measured along the path of reciprocation of the insertion means between relatively upwardly and downwardly facing surfaces of the module body portion when the module is inserted into a circuit board. This problem is encountered due to the requirement that precise orientation of the module be maintained during feeding or transfer of a module from the supply to the supporting assembly and while the module is positioned on the supporting assembly to insure a trouble-free feeding operation and alignment of the module with respect to the insertion means. Accordingly, after the module guides of the apparatus have been designed to accommodate any given size module, modules of a larger size cannot be accommodated by the apparatus and modules of a smaller size are likely to become jammed or misaligned. Additionally, the insertion head of the apparatus is normally designed to have a predetermined first or up position which is chosen to permit a module of a predetermined size to be positioned under the inserting means on the supporting assembly; a minimum space allowance between the bottom of the insertion head and the upper surface of the component being desirable to reduce the distance through which the inserter is reciprocated and thus the time required for each insertion operation.

Further, in apparatus of the type disclosed in Ser. No. 574,394, now U.S. Pat. No. 3,442,430, there is normally provided only one module supply magazine or dispenser, which may be detachably connected to the inlet end of the module feed or transfer assembly. Thus, when it is desired to sequentially insert modules having different circuit characteristics, it is necessary to first sequence such modules into the single supply magazine in a separate hand-loading operation or by module sequencing apparatus which is not normally associated with the insertion apparatus.

The difficulty of constructing insertion apparatus is compounded by the fact that not only modules having different circuit characteristics vary in size or body portion thickness, but commercially available modules having identical circuit characteristics have been found to vary as much as .100 inch in thickness, depending upon the manufacturer or supplier from which the modules is obtained.

Accordingly, it is an object of the present invention to provide an apparatus adapted to insert modules of varying size.

More specifically, it is an object of the present invention to provide an insertion apparatus which is adapted to be automatically adjusted prior to each insertion operation in accordance with the size or thickness of the module presented for insertion.

A further object is to provide a supply adapted to sequentially present various size modules directly into an insertion apparatus, which is automatically adjustable to accommodate the size module presented thereto.

The above mentioned disadvantages are overcome in the insertion apparatus according to the present invention by providing a supply including a plurality of supply magazines or dispensers; one for each type of module required to form a desired circuit board arrangement. The magazines are mounted on a carriage which is movable to position the outlets of the respective magazines in a desired sequence with respect to a reference dispensing position. Any suitable control system including for instance a punched read-out tape may be employed to control movement of the carriage. In that not only modules of different circuit characteristics tend to vary in size, but modules having the same circuit characteristics may vary in size depending upon the manufacturer from which they are obtained, there is provided means on each of the magazines to indicate the size of module contained therein. Since there may be an infinite variation in size between modules, it has been found desirable in order to reduce the complexity of the apparatus to consider that the various sized modules of all types to be inserted will fall within one of a definite number of groups, as for example four groups, wherein the variation in module size within each group is one-fourth of the possible difference between the smallest and largest module adapted to be handled by any given insertion apparatus. Various means, such as a button magnetically attached at one of four indicator positions, may be employed to visually indicate which module group size is positioned within each of the magazines. Suitable means disposed adjacent the reference dispensing position is then employed to sense the position of the button affixed to a magazine when sequenced into such position and to produce a control signal which is characteristic of the sensed button position. The control signal is employed in turn to control operation of a motion limiting assembly for the insertion means, which is provided with differently configured stop surfaces corresponding in number to the indicator positions provided on each of the magazines. By this arrangement, a first or upper position of the insertion means may be varied in accordance with the size or thickness of a module presented at the reference dispensing position for insertion. To insure that a module transferred from a magazine disposed at the reference dispensing position to the supporting assembly is properly guided and positioned on the support assembly, there is provided a movable guide for the module which is adapted to be adjustably positioned by the inserter in accordance with the first position into which the inserter is moved.

A fuller understanding of the present invention may be had by referring to the following description, taken in conjunction with the accompanying drawings in which.

Figures 1, 2:
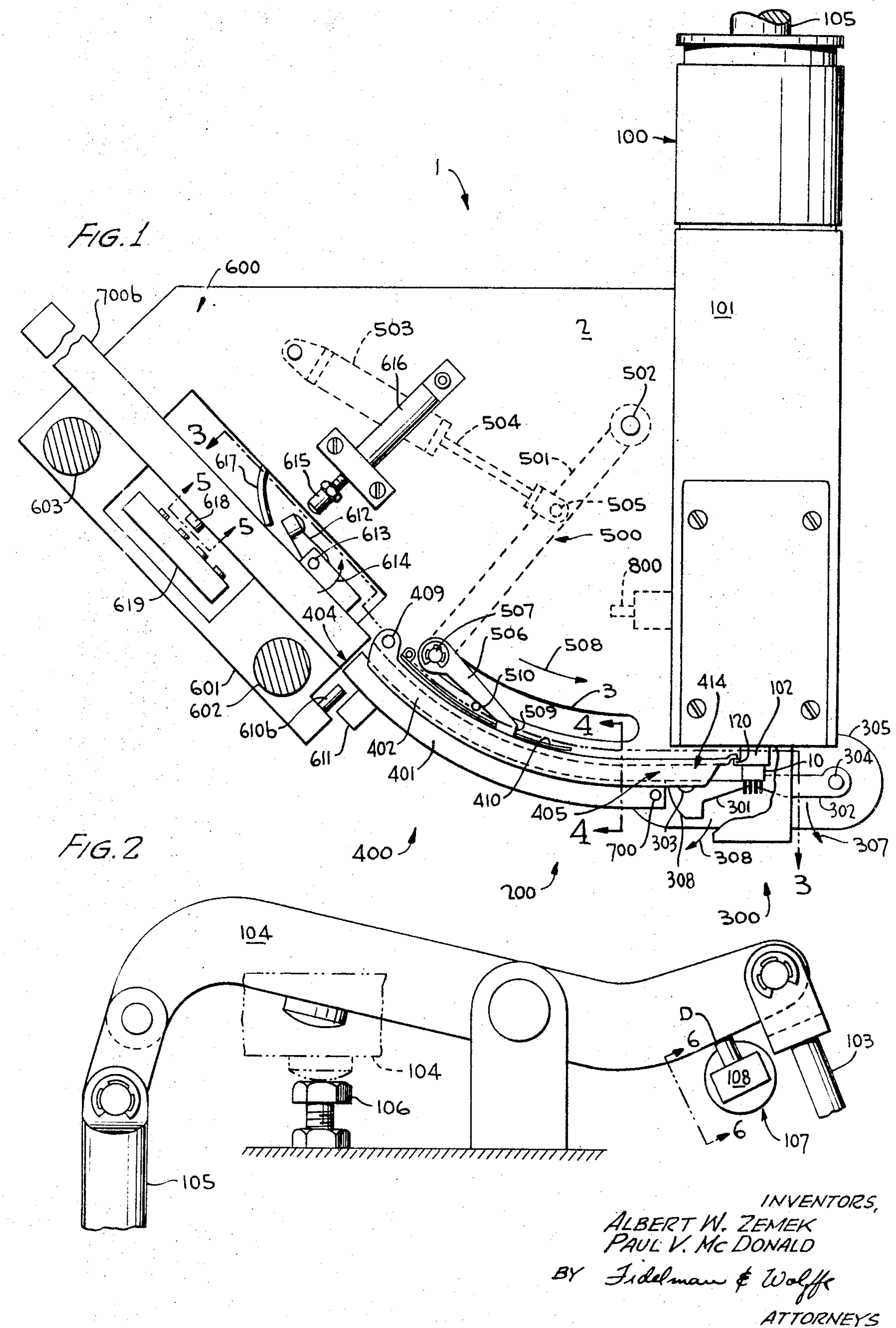
FIG. 1 is a front elevational view of the insertion apparatus of the present invention.
FIG. 2 is a fragmentary view illustrating the structure of the upper end of the inserter actuating control rod and the motion limiting adjustments therefor.

The module insertion apparatus of the present invention is generally designated as 1 in FIG. 1 and is shown as including a module insertion assembly, designated as 100, a module positioning assembly, designated as 200, and a module supply assembly, designated as 600. The respective assemblies are mounted in any suitable manner on an apparatus framework 2, only portions of which are shown in the figures.

Figure 7:
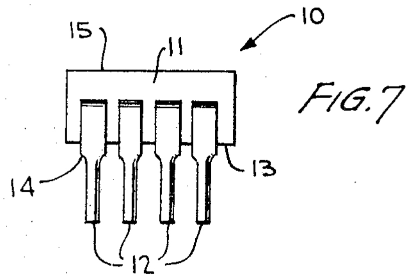
FIG. 7 is a side elevational view of a module for which the apparatus of the present invention is adapted for use.

The apparatus of the present invention is particularly adapted for use in inserting modules of the type generally designated as 10 in the figures into a suitable circuit board, not shown, which is adapted to be supported by pantograph, also not shown, for horizontal movement immediately below insertion assembly 100. By referring particularly to FIGS. 4 and 7, it will be seen that components 10 are characterized by a body portion 11 and a plurality of generally L-shaped leads 12 which extend from opposed side surfaces of body portion 11. Normally, leads 12 are of equal length and the free ends thereof project a substantial distance below lower surface 13 of module body portion 11. It will be understood that when the module is in inserted position lower surface 13 is normally spaced from the surface of the circuit board by lead enlargements 14. The term body portion thickness, as hereinafter used, will be understood to refer to the distance between the lower surface 13 of body portion 11 and the upwardly facing surface thereof, which is designated as 15.

The structure of module insertion assembly 100 is substantially identical to that disclosed in application Ser. No. 574,394 and therefore will not be described in detail. However, to facilitate understanding of the present invention, specific reference will be made to several parts of insertion assembly 100 including housing 101 in which a module inserter 102 is supported for reciprocation between a first or upper position, shown in FIG. 1, and a lower or module insertion position, not shown. Reciprocation of inserter 102 is effected by means of a suitable pneumatic cylinder, not shown, acting through cylinder rod 103, control linkage 104 and control rod 105, generally shown in FIG. 2. As in the apparatus disclosed in Ser. No. 574,394, now U.S. Pat. No. 3,442,430, the insertion or lower position of inserter 102 may be controlled by adjustment screw 106 against which control linkage 104 is adapted to abut, as shown in phantom in FIG. 2.

Figure 6:
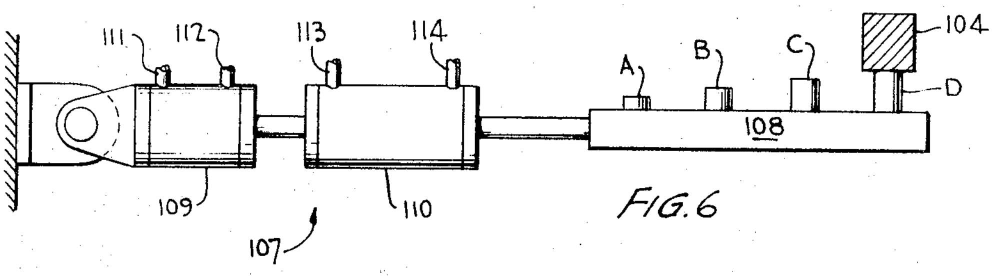
FIG. 6 is a sectional view taken generally along line 6—6 of FIG. 2.

In accordance with the present invention, the first or upper position of inserter 102 is adjustably controlled by a motion limiting mechanism generally designated as 107. Mechanism 107 is shown in FIGS. 2 and 6 as including a member 108 having a plurality of varied height stop surfaces, as for example four designated as A, B, C, and D, which are adapted to be selectively positioned beneath control linkage 104 for the purpose of controlling the extent of movement thereof in a clockwise direction, when viewed in FIG. 2, and thus the first position of inserter 102. Member 108 may be reciprocated transversely of linkage 104 by any suitable means, such as coupled, double acting pneumatic cylinders 109, 110 having suitable air inlet and exhaust lines 111, 112 and 113, 114 respectively. It will be understood that in the embodiment of the invention illustrated, the sizes of cylinders 109, 110 are selected to permit them to be employed singularly or in combination to selectively position stop surfaces A–D one at a time in operable position beneath control linkage 104. Thus, for instance, if it is assumed that the spacing between the centers of adjacent stop surfaces is one inch, that cylinder 109 has a one-inch displacement, that cylinder 110 has a two-inch displacement, and that member 108 is originally positioned as shown in FIG. 6, stop surface C may be moved into operable position below control linkage 104 by supplying pressurized air to cylinder 109 through conduit 111 and venting conduit 112. Thereafter, if it is desired to position stop surface B below control linkage 104, air under pressure is supplied to conduits 112 and 113 and conduits 114 and 111 vented.

In the preferred embodiment of the present invention, equal height variations are provided between adjacent stop surfaces A–D for the reason to be hereinafter discussed. Also, in accordance with the present invention, insertion assembly 100 differs from that disclosed in application Ser. No. 574,394 in the provision on module inserter 102 of abutment flange or shelf 120, the function of which will hereinafter be described in detail.

Figures 3, 4, 5:
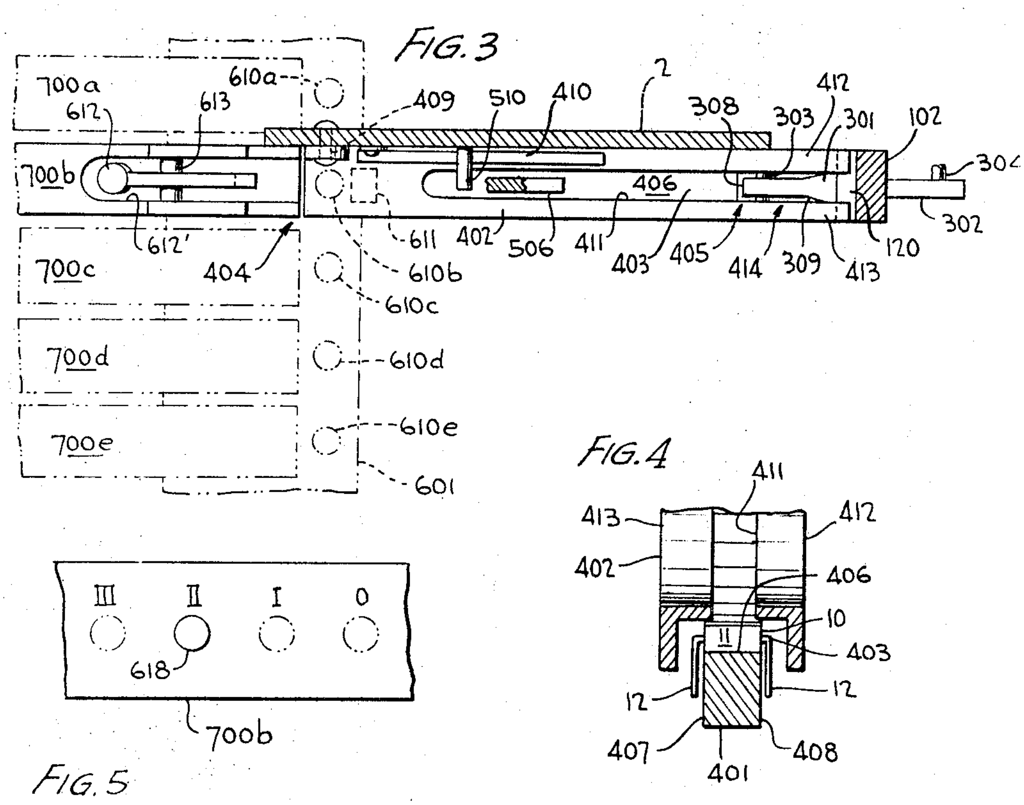
FIG. 3 is a sectional view taken generally along the line 3—3 of FIG. 1.
FIG. 4 is a sectional view taken generally along the line 4—4 of FIG. 1.
FIG. 5 is a sectional view taken generally along the line 5—5 of FIG. 1.

Module positioning assembly 200 is shown primarily in FIGS. 1 and 3 as comprising a module support assembly, generally designated as 300, and means to feed modules onto assembly 300 which includes a module guide chute, generally designated as 400, and a module feeder, generally designated as 500.

The structure and mode of operatiton of the module support assembly 300 is substantially identical to that disclosed in Ser. No. 574,394 and thus will only be described in sufficient detail to facilitate understanding of the present invention. By referring to FIGS. 1 and 3, it will be seen that module support assembly 300 includes module support members 301, 302, which are suitably affixed to pivot shafts 303, 304, respectively, received within bore openings, not shown, provided in bracket 305. Bracket 305 may be affixed to either inserter housing 101 or apparatus framework 2 by any suitable means, not shown. In FIG. 1 members 301, 302 are shown as being in their up position in which they cooperate to support module 10 in alignment with the path of reciprocation of inserter 102 when the latter is in its first or upper position. It will be understood that members 301, 302 are adapted to be pivoted about the axes of shafts 303, 304 in the directions indicated by arrows 306, 307, respectively, from the position shown in FIG. 1 to a retracted position, not shown, to permit inserter 102 and module 10 carried thereby to be reciprocated downwardly into module insertion position. If desired, member 301 may be provided with an abutment surface 308, which is adapted to prevent feeding of a module onto the support members 301, 302 when they are in a pivotable position other than that illustrated in FIG. 1. Also, as will be apparent from viewing FIG. 3, the opposed vertically extending sides 309 of member 301 may diverge so as to effect relatively outward straightening of the module leads when the module is pushed onto members 301, 302 in the manner to be hereinafter described.

Module guide chute 400 is shown in FIGS. 1, 3 and 4 as including a stationary lower guide member 401 and a relatively movable upper guide member 402, which cooperate to define a module feeding or transfer passageway 403 extending from an inlet generally indicated as 404 and disposed adjacent to supply assembly 600, to an outlet generally designated as 405 and disposed adjacent module support assembly 300. Specifically, lower guide member 401, which may be suitably affixed to framework 2, is provided with a smooth upwardly facing surface 406 which constitutes an extension of the module supporting upper surface of support member 301 when the latter is in its supporting position and is adapted to slidably support lower body portion surface 13 during the passage of module 10 downwardly through passageway 403 in the manner illustrated in FIG. 4. Opposed vertically extending guide surfaces 407, 408 of lower guide member 401 are employed to maintain transverse positioning of module 10 during movement thereof through passageway 403 to insure proper alignment thereof with respect to support member 301 adjacent outlet 405.

Again referring to FIGS. 1 and 3, it will be apparent that movable upper guide 402, which is pivotally supported adjacent inlet 404 by a pinshaft 409, is normally biased in a clockwise direction, as viewed in FIG. 1, into an inoperable position, wherein it is disposed in engagement with either the upwardly facing surface 406 of stationary guide 401 adjacent chute outlet 405 or other suitable downward motion limiting abutment, not shown, by the combined effects of gravity and leaf spring 410. Both pinshaft 409 and spring 410 are suitably affixed to framework 2. Guide 402 is shown particularly in FIGS. 3 and 4 as having a cut-out or slot 411 which defines a pair of fingers 412, 413 having free ends which project beyond passageway outlet 405 and cooperate with support member 301 to define an extension, generally indicated at 414, of passageway 403 for the purpose of ensuring proper positioning of a module passing from chute 400 onto support assembly 300. It will be understood that the width of cut-out 411 is sufficient to permit operation of feeder 500 in the manner hereinafter to be described and to permit the rearwardly extending end of support member 301 on which is disposed abutment 308 to move upwardly adjacent the end of stationary guide 401 to block passageway outlet 405 without engaging either of arms 412, 413 when support members 301, 302 are pivoted into retracted position. The width of cut-out 411 is, however, sufficiently restricted to insure that facing side edge surfaces of both fingers 412 and 413 overlie the upwardly facing body portion surface 15 of a module disposed in passageway 403, thereby preventing transverse tilting of the module during both movement of a module through passageway 403 and as the module is positioned on support member 301.

Although subject to design variation, it is anticipated that the height of passageway 403 at inlet 404, i.e. the vertical spacing between guides 401 and 402, will be slightly greater than the maximum size or body portion thickness of presently available modules. The height of passageway 403 adjacent outlet 405 is adjustable between zero or some nominal design value, when inserter 102 is in insertion position, and a maximum height corresponding to that of passageway 403 at inlet 404, when inserter 102 is in its first position. In this respect it will be understood that upon movement of inserter 102 towards its first position, inserter abutment flange 120 is adapted to operably engage the free ends of movable guide fingers 412, 413, whereby forcing movable guide 402 to pivot in a counterclockwise direction, as viewed in FIG. 1, against the bias of leaf spring 410. Thus, the extent of upward movement of inserter 102, i.e., its first position which is adjustably controlled by motion limiting mechanism 107, determines the angle through which movable guide 402 is pivoted and accordingly the adjusted height of passageway 403 and passageway extension 414. Upon movement of inserter 102 towards insertion position, lowering of the inserter abutment flange 120 below chute 400, permits leaf spring 410 to return movable guide 402 to its inoperative position mentioned above.

Module feeder 500, which is similar in structure and mode of operation to that described in Ser. No. 574,394, now U.S. Pat. No. 3,442,430, is shown in FIG. 1 as including arm member 501, which is pivotally supported on framework 2, as at 502, and adapted to be moved between a cocked position, illustrated in FIG. 1, and a module feed position, not shown, by a pneumatically operated cylinder 503 acting through rod 504, which is pivotally affixed to arm 501 at 505. Arm 501 is provided adjacent the lower end thereof with a module pushing finger 506 which is pivotally affixed thereto by pivot pin 507 and normally biased in a clockwise direction about the axis of pin 507, as viewed in FIG. 1, by a coiled spring, not shown. Framework 2 is provided with an arcuate slot 3 to accommodate pivot pin 507 during module feeding movement of pushing finger 506 in the direction indicated by arrow 508. During feeding movement of pushing finger 506, the module engaging end thereof, indicated generally at 509, is received within passageway 403 through cut-out 411 provided in movable guide 402. By referring to FIG. 1, it will be seen that when arm 501 is returned to its cocked position by cylinder 503, abutment pin 510 carried on framework 2 is adapted to engage the lower edge of pusher finger 506 for the purpose of pivoting finger 506 in a counterclockwise direction about pin shaft 507 to remove the module engaging end thereof from passageway 403 and thus permit unobstructed passage of a module beneath pusher finger 506.

Module supply assembly 600 is shown generally in FIGS. 1 and 3 as including a carriage 601 on which are suitably mounted a plurality of spaced apart module supply magazines or dispensers, for example magazines 700*a*–700*e*, only magazine 700*b* being shown in full line for the purposes of clarity. Carriage 601 is slidably mounted on a pair of spaced guides 602, 603 for reciprocation transversely below machine framework 2 for the purpose of positioning magazines 700*a*–700*e* one at a time in a reference module discharge or dispensing position in alignment with inlet 404 of passageway 403.

In practice, the number of magazines to be utilized, the number of modules to be dispensed from each magazine during each cycle of operation, i.e., fabrication of one circuit board, and the sequence through which the several magazines are positioned at the reference discharge or dispensing position, varies with the complexity of a circuit board to be fabricated. For instance, if it were desired to fabricate a series of circuit boards each requiring five different types of modules, for example module types 10*a*–10*e*, all of the magazines 700*a*–700*e*, respectively, illustrated in FIG. 3 would be required, since any given magazine carries only one type of module. The sequence through which magazines 700*a*–700*e* are to be positioned at the reference discharge position is then determined by the requirements of the circuit board to be fabricated, i.e., the number of modules of each type required and the sequence of module receiving positions through which the circuit board is to be moved by a pantograph beneath inserter 102 during fabrication. Exemplatory of magazine requirements and sequencing for fabrication of a circuit board having nine module receiving positions and requiring 5 differing types of modules is as follows:

| | Module type required | Magazine at reference dispensing position |
|---|---|---|
| Module receiving board position: | | |
| 1 | 10*b* | 700*a* |
| 2 | 10*c* | 700*c* |
| 3 | 10*a* | 700*a* |
| 4 | 10*a* | 700*b* |
| 5 | 10*b* | 700*b* |
| 6 | 10*d* | 700*d* |
| 7 | 10*e* | 10*e* |
| 8 | 10*b* | 10*b* |
| 9 | 10*e* | 10*e* |

It will be noted from the above example that during each cycle of operation, i.e., fabrication of one circuit board, magazine 700*a* is not withdrawn from reference dispensing position between board positions 3 and 4, and that at the completion of each circuit board fabrication, carriage 601 automatically returns magazine 700*b* to its original position. Modification of the operation described may be easily accomplished within the limitation of the maximum number of magazine stations provided along carriage 601, such stations being generally indicated in FIG. 3 by station indicators 610*a*–610*e*, by varying the number of magazines employed and the movement of carriage 601.

Any suitable means may be employed to control reciprocation of carriage 601, such as coupled pneumatically operated cylinders, not shown, whose operation is determined by a pneumatically operated master control, including, for example, a punched read-out tape, also not shown. Further, any siutable means may be employed to determine proper positioning of the magazines at the reference dispensing position, such as a magnetic senser 611, which is employed to scan station indicators 610*a*–610*e*.

For purposes of the present invention, magazines 700*a*–700*e* may be of any desired construction, but preferably are provided with an internal cross sectional configuration corresponding to that of module passageway 403 to facilitate the transfer of modules therebetween, and, as specifically illustrated in the case of magazine 700*b*, a generally L-shaped escapement 610 received within magazine cutout or opening 612'. Escapement 612 is pivotally supported on a pinshaft 613 and normally biased into a magazine discharge outlet blocking position, as indicated in FIG. 1, by spring means, not shown. When one of the magazines is in the reference discharge position, its escapement may be pivoted in the direction indicated by arrow 614 in FIG. 1 to momentarily unblock the magazine discharge outlet by any suitable means, such as rod 615 of framework mounted, double acting pneumatic cylinder 616. Further, any suitable means may be employed to force one module at a time from a properly positioned magazine into module passageway 403 downwardly past pushing finger 506 upon actuation of escapement 612, as for instance a blast of pressurized air issuing from tube 617 into magazine opening 612'.

Now referring particularly to FIGS. 1 and 3, it will be understood that each of magazines 700*a*–700*e* is provided on its lower surface with a plurality of indicator positions, identified as 0, I, II, and III and an indicator button 618, which is adapted to be removably affixed as by magnetic attraction at one of the indicator positions. Any suitable sensing means, such as four micro switches generally indicated at 619, may be disposed adjacent the reference discharge or dispensing position and employed to sense the relative positioning of indicator button 618 on a magazine upon positioning thereof at the reference discharge position.

The purpose of providing the several indicator positions and movable indicator button on each of the magazines is to indicate the size of the modules contained therein so as to permit the insertion apparatus to automatically adjust itself to accommodate the size of module presented for insertion by each magazine. The need for permitting automatic adjustment of the insertion apparatus is demonstrated by the fact that boh modules of differing types or circuit characteristics and modules of the same type or circuit characteristic, but obtained from different manufacturers, may vary in size or body portion thickness. Accordingly, unless some adjustment of the insertion apparatus is possible, improper feeding and insertion of modules will result. It has been found that by dividing presently available modules, irrespective of module type, into four equal size variation groups, the variation in size of modules within any group may be diminished to a value for which the insertion machine may be designed to properly accommodate. Obviously, the number of module size groups may be increased to permit finer adjustment of the insertion apparatus, or means may be provided to sense the exact size of a presented module and to adjust the insertion apparatus accordingly. Thus, it will be apparent that an operator may manually position the respective buttons 618 on magazines 700*a*–700*e* in order to provide both a visual indication of the group size of modules contained within each of the magazines and an indicator which may be sensed by sensor 619 for the purpose of producing an insertion machine adjusting control signal which is characteristic of the group size of a module presented at the reference discharge position. The control signal is employed to control operation of cylinders 109 and 110, through a suitable control circuit, not shown, thereby effecting positioning of one of stop surfaces A–B. The number of stop surfaces provided for any given insertion machine will correspond in number to the module group sizes to be employed, and of course the height variation between adjacent stop surfaces will be equal, when it is desired to have an equal module size variation between the several groups. In the embodiment disclosed, stop surface A adjusts the insertion apparatus to accommodate the largest module group size, which may be indicated on the magazines by position III.

In explaining the operation of the insertion apparatus of the present invention, it will be helpful to assume that a cycle of operation is nearing completion with the inserter 102 being in its lower position after inserting the last of the modules of a particular certain board arrangement, for instance, module 10*e* of the example given above. In this position, module support members 301 and 302 are in their inoperable position with abutment surface 308 of support member 301 acting to block outlet 405 of passageway 403. Further, cylinder 503 has been actuated to retract pusher finger 506 into the position illustrated in FIG. 1 where it is removed from passageway 403 by engagement with pin 510. Still further, the apparatus master control has operated to position magazine 700*b* in the reference discharge position, whereupon sensor 619 senses the positioning of indicator button 618 in the II indicating position and controls operation of cylinders 109, 110 to shift stop surface B into operable position beneath control linkage 104. Thereafter, cylinder 616 is momentarily operated to actuate escapement 612 of magazine 700*b* to permit one type 10*b* module to be discharged and propelled downwardly through passageway 403 to a position between the module engaging end 509 of pusher finger 506 and abutment surface 308 of support member 301. Normally forward motion of module 10*b* within passageway 403 is arrested before reaching abutment surface 308 due to frictional engagement with module guides 401 and 302 and the fact that, with movable guide 402 in its inoperable position, the height of passageway 403 adjacent outlet 405 is less than the minimum module size being handled by the inserter apparatus. Subsequently, inserter 102 is retracted to its upper or first position which is determined by abutting engagement with stop surface B of control linkage 104. During such movement, abutment 120 on inserter 102 is adapted to engage the ends of guide fingers 412, 413 and pivot movable guide 402 about the axis of pivot pin 409. When thus positioned, movable guide 402 is spaced from guide surface 406 of the stationary guide 401 a distance necessary to properly accommodate module **10*b* for continued passage through passageway 403 and passageway extension 414 onto component support members 301 and 302, such members having been previously returned to their supporting position. Immediately thereafter, cylinder 503 is operated to force pusher finger 506 in a direction indicated by arrow 508 to force module 10*b* through the outlet 405 onto and along the upper surface of support member 301 and onto support member 302. As in the insertion apparatus disclosed in application Ser. No. 574,394, sensing means 700 suitably carried on chute 400 may be employed to monitor the presence of a module adjacent outlet 405, and suitable sensing means 800 may be employed to monitor the final feed position of feed finger 506. The immediately succeeding portions of the insertion cycle are identical to those described in application Ser. No. 574,394, now U.S. Patent No. 3,442,430 with the feed finger being withdrawn to inoperable position illustrated in FIG. 1, inserter 102 being reciprocated downwardly to insert module 10*b* and module supports 301 and 302 being returned to their inoperative position. With the inserter in its insertion position, the sequence of events thus described is repeated, with magazine 700*b* being replaced by magazine 700*c***.

Alternatively dispensing of a module from a properly positioned magazine may be delayed until the inserter has returned to its first position and the module passageway adjusted. In this case, the operation of the apparatus is similar, except that actuation of pusher finger 506 is effected immediately after dispensing of a module. If desired, passage of a dispensed module onto the component support assembly prior to actuation of the pusher finger may be retarded by a spring detent disposed adjacent the outlet of the module feeding passageway.

While there has been described in detail only embodiment of the insertion apparatus of the present invention, various modifications thereof will occur to one skilled in the art in view of the foregoing description. Exemplary of possible variations or modifications of the preferred embodiment would be to provide means to indicate an infinite number of module size variations accompanied by means to accomplish infinite variation of the first position of the insertion means and/or the module guide passageway, as for instance by providing a wedge defining an infinite number of stop surfaces. Further, rather than providing indicating or indicia means on each of the magazines and an indicia sensor, it is contemplated that an adjustment control signal may be produced by means including sensing fingers or photoelectric means employed to directly measure the size of each presented module, either while it is within the magazines or while adjacent the inlet end of the feed chute. Also, an adjustment control signal may be produced by an adjustable memory unit or control circuit separate from the magazines; the former being programmed by an operator of the insertion apparatus and correlated with the control for positioning of the magazines in a desired sequence. Additionally, it is contemplated that the movable upper guide of the feed chute may be mounted in such a manner as to permit adjustment of the height of module passageway uniformly between the inlet and outlet thereof, and means other than the inserter may be employed to move such guide into an adjusted position. Accordingly, I wish to be limited only by the scope of the appended claims.

What is claimed is:

1. An apparatus for inserting modules having body portions of varying sizes with a plurality of leads extending therefrom, said apparatus comprising a module insertion means having a portion adapted to be reciprocated along a path between a first position and a module insertion position; means to position one module at a time in alignment with said path of reciprocation of said insertion means portion at a point intermediate said positions when said insertion means is in said first position to permit said insertion means portion thereafter to engage said positioned module during reciprocation thereof to said insertion position, said module when positioned having a body portion thickness with reference to said path of reciprocation of said insertion means portion; means to produce a signal which is characteristic of said thickness of a module to be positioned; and means operable in response to said signal to vary said first position of said insertion means portion in accordance with said thickness of a module to be positioned.

2. A module insertion apparatus according to claim 1, wherein said operable means includes a member having a plurality of stop means, each said stop means when placed in operable relation with respect to said insertion means portion being adapted to arrest reciprocation of said insertion means at a different point spaced from said insertion position to define a different first position of said insertion means, said member being movable to selectively position said stop means one at a time in said operable position in accordance with said body portion thickness of a module to be positioned.

3. A module insertion apparatus according to claim 1, wherein said module positioning means includes a module support assembly adapted to support one module at a time in alignment with said path of reciprocation of said insertion means portion when in said first position and means to guidably position a module with respect to said support assembly, said guide means being movably supported with respect to said support assembly to permit accommodation of modules having varying body portion thickness therebetween, and said insertion means being operably associated with said guide means whereby when said insertion means portion is moved into said first position said guide means is adjustably positioned with respect to said support assembly in accordance with said body portion thickness of a module to be positioned.

4. An apparatus for inserting modules having body portions of varying thicknesses with a plurality of leads extending therefrom, said apparatus comprising a module insertion means having a portion adapted to be reciprocated along a path between a first position and a module insertion position; means to position modules one at a time in alignment with said path of reciprocation of said insertion means portion at a point intermedate sad positions when said insertion means portion is in said first position to permit said insertion means portion to thereafter engage said positioned module during reciprocation thereof to said insertion position, said module when postioned having a body portion thickness with reference to said path of reciprocation of said insertion means portion; module supply means adapted to present one module at a time to said positioning means; means adapted to produce a signal which is characteristic of said body portion thickness of a presented module; and means operable to vary said first position of said insertion means portion, said signal producing means being operably associated with said operable means so as to vary said first position of said insertion means portion in accordance with said thickness of said presented module.

5. A module insertion apparatus according to claim 4, wherein said module supply means includes a plurality of module dispensers and a dispenser supporting carriage, said carriage being adapted to position said dispensers one at a time at a reference dispensing position adjacent said positioning means to permit said positioned dispenser to present a module thereto, and said signal producing means includes means associated one with each of said dispensers and adapted to indicate the thickness of the body portion of a module to be presented thereby, and sensing means disposed adjacent said reference dispensing position, said sensing means being responsive to said indicating means and adapted to control operation of said operable means.

6. A module insertion apparatus according to claim 5, wherein said operable means includes a member having a plurality of stop means, each said stop means when placed in operable relation with respect to said insertion means portion being adapted to arrest reciprocation of said insertion means portion at a different point spaced from said insertion position to define a different first position of said insertion means portion, said member being movable to selectively position said stop means one at a time in said operable position; and said indicating means includes a plurality of indicating positions, each of which represents a given module body portion thickness, and movable means adapted to be selectively positioned at one of said positions, said indicating positions corresponding in number to said stop means, and said sensing means is responsive to the position of said movable means, whereby the position of said movable means determines which of said stop means is placed in operable relation with respect to said insertion means portion.

7. A module insertion apparatus according to claim 4, wherein said module positioning includes a support assembly adapted to support one module at a time in alignment with said path of reciprocation of said insertion means portion when in said first position and means adapted to feed one module at a time from said supply means onto said support assembly, said feed means including relatively movable module guides cooperating to define a module feed passageway having an inlet adjacent said supply means and an outlet adjacent said support assembly, said guides being moved relatively to effect adjustment of said passageway in accordance with said thickness of said presented module.

8. A module insertion apparatus according to claim 7, wherein one of said guides is stationary and another of said guides is supported for motion relative to said stationary guide and said support assembly, said stationary guide constituting an extension of said support assembly and serving to slidably support modules passing through said passageway, said movable guide vertically overlying said stationary guide and having an end thereof vertically overlying said support assembly to define therewith an extension of said passageway, and said insertion means portion being adapted to operably engage said end of said movable guide, whereby when said insertion means portion is moved into said first position, said movable guide is adjustably positioned vertically with respect to said stationary guide and said support assembly to effect adjustment of said passageway and said passageway extension in accordance with said thickness of said presented module.

9. A module insertion apparatus according to claim 8, wherein said movable guide is affixed for vertical pivotable movement about an axis disposed adjacent said passageway inlet and is provided with a slot opening which extends lengthwise of said passageway, said feed means additionally includes means operative to force modules through said passageway and said passageway extension onto said support assembly, said forcing means including a module pushing member removably received within said passageway through said slot for module feeding movement along said passageway from a first point to a second point disposed adjacent said support assembly and means to remove said pushing member from said passageway upon completion of said feeding movement.

10. An apparatus for inserting modules having body portions of varying thicknesses with a plurality of leads extending therefrom, said apparatus comprising a module insertion means having a portion adapted to be reciprocated along a path between a first position and a module insertion position; a support assembly adapted to position one module at a time in alignment with said path of reciprocation of said insertion means portion at a point intermediate said positions when said insertion means portion is in said first position to permit said insertion means portion to thereafter engage said positioned module during reciprocation thereof to said insertion position, said module when positioned having a body portion thickness with reference to said path of reciprocation of said insertion means portion means to feed modules one at a time onto said support assembly including relatively movable guides cooperating to define a module feeding passageway having an inlet and an outlet disposed adjacent said support assembly; module supply means adapted to present one module at a time to said feed means adjacent said passageway inlet; means to produce a signal which is characteristic of said body portion thickness of said presented module; and means operable in response to said signal to relatively move said guides to effect adjustment of said passageway in accordance with said thickness of said presented module.

11. An apparatus according to claim 10, wherein one of said guides is stationary and another of said guides is supported for motion relative to said stationary guide and said support assembly, said stationary guide constituting an extension of said support assembly and serving to slidably support modules passing through said passageway, said movable guide vertically overlying said stationary guide and having an end thereof vertically overlying said support assembly to define therewith an extension of said passageway, said movable guide being adjustably positioned vertically with respect to said stationary guide and said support assembly to effect adjustment of said passageway and said passageway extension in accordance with said thickness of said presented module.

12. An apparatus according to claim 10, wherein said module supply means includes a plurality of module dispensers and a dispenser supporting carriage, said carriage being adapted to position one of said dispensers at a time at a reference dispensing position adjacent to said passageway inlet to permit said positioned dispenser to present a module thereto, and said signal producing means includes means associated one with each of said dispensers and adapted to indicate the thickness of the body portion of a module to be presented thereby, and sensing means disposed adjacent said reference dispensing position, said sensing means being responsive to said indicating means and adapted to control operation of said operable means.

13. A module insertion apparatus according to claim 12, wherein said operable means includes means adapted to arrest reciprocation of said insertion means portion at different points spaced from said insertion position to define different first positions of said insertion means portion as determined by said characteristic signal.

14. A module insertion apparatus according to claim 13, wherein one of said guides is stationary and another of said guides is supported for movement relative thereto, said stationary guide constituting an extension of said support assembly and serving to slidably support a module passing through said passageway, said movable guide vertically overlying said stationary guide and having one end thereof vertically overlying said support assembly to define therewith an extension of said passageway, and said operable means additionally includes abutment means carried on said insertion means, said abutment means being adapted to operably engage said one end of said movable guide when said insertion means is moved into said first position, whereby said movable guide is relatively positioned vertically with respect to said stationary guide and said support assembly to effect adjustment of said passageway and said passageway extension in accordance with said thickness of said presented module.

References Cited

UNITED STATES PATENTS

| | | | |
|---|---|---|---|
| 2,879,585 | 3/1959 | Petersen | 29—203B |
| 3,043,001 | 7/1962 | Gluck | 29—203B |
| 3,442,430 | 6/1969 | Ackerman et al. | 227—2 |

THOMAS H. EAGER, Primary Examiner

U.S. Cl. X.R.

29—407